United States Patent Office 3,244,476
Patented Apr. 5, 1966

3,244,476
METHOD OF PRODUCING CRUDE SODA ASH FROM CRUDE TRONA WITH SELECTIVE PULVERIZATION
Lewis K. Smith, Covina, Calif., assignor, by mesne assignments, to Intermountain Research & Development Corporation, Cheyenne, Wyo., a corporation of Wyoming
No Drawing. Filed Jan. 9, 1963, Ser. No. 250,225
5 Claims. (Cl. 23—63)

The invention relates to a method of processing trona to produce a crude calcined trona having a high $Na_2CO_3$ content and a low content of insoluble materials which is suitable for use as crude soda ash in many processes where refined soda ash is presently used.

In Sweetwater County and adjacent counties in Wyoming there are large deposits of trona which consists essentially of sodium sesquicarbonate $$(Na_2CO_3 \cdot NaHCO_3 \cdot 2H_2O)$$

contaminated with shale and small amounts of other impurities. The trona has the following approximate composition:

| Constituent: | Percent |
|---|---|
| $Na_2CO_3$ | 43.51 |
| $NaHCO_3$ | 36.11 |
| $H_2O$ | 13.14 |
| $Na_2SO_4$ | 0.02 |
| $NaCl$ | 0.08 |
| $Fe_2O_3$ | 0.14 |
| Organic matter | 0.30 |
| Shale and other insolubles | 6.70 |

The Wyoming trona can be processed to produce a refined soda ash therefrom by a number of different processes such as described in the Pike Patent No. 2,639,217, the Seaton et. al. Patent No. 2,770,524 or the Bauer et al. Patent No. 2,962,348. In general these processes involve dissolving crude trona or crude calcined trona, separating the insoluble material and other impurities from the solution, evaporating and cooling the solution to crystallize therefrom sodium carbonate values in different forms and calcining the said crystals to produce soda ash. Due to their complicated nature these processes are expensive and make the production of soda ash from Wyoming trona expensive.

It is an object of this invention to provide a relatively inexpensive process for the production of crude soda ash from crude trona which can be used in some of the processes which now utilize refined soda ash.

It is another object of the invention to increase the percentage of soda ash and decrease the amount of insoluble materials in crude soda ash made from calcined crude trona.

It is a further object of the invention to provide a process in which the change in the relative hardness of the soluble and insoluble fractions of crude trona brought about by calcination of the crude trona is utilized to effect a better separation of the soluble and insoluble fractions of the trona, the soluble fraction consisting of sodium carbonate and the insoluble fraction consisting of undesired shale, silica, etc.

These and other objects and advantages of the invention will become obvious from the following detailed description.

During the calcination of crude trona, carbon dioxide and water are driven off according to the following reaction:

$$2(Na_2CO_3 \cdot NaHCO_3 \cdot 2H_2O) \rightarrow 3Na_2CO_3 + 5H_2O\uparrow + CO_2\uparrow$$

The conversion of the sodium bicarbonate to sodium carbonate by the removal of carbon dioxide and water from the crude trona produces porous crystals of soda ash while the high calcining temperature sinters the shale and other insoluble materials. The net result is that the soda ash (soluble) fraction is softened while the shale (insoluble) fraction remains at substantially the same hardness. Advantage is taken of this difference in hardness of the soda ash and shale after calcining to effect separation of the desired fraction from the undesired fraction.

The process of the invention comprises calcining crude trona to change the sodium sesquicarbonate to porous soda ash, beneficiating the calcined crude trona so that the porous soda ash is broken to a smaller size than the shale, screening the beneficiated crude trona so that the shale and other insolubles are retained on the screen and discarded and recovering the soda ash with a low insoluble content which passed through the screen.

The beneficiation can be effected in a number of ways, such as by preferential crushing, air blasting or the like. For purposes of illustration, preferential crushing with multiple roll crushers is used.

The shale after calcination is approximately five times harder than the soda ash. The relative hardness was determined by placing particles of calcined trona or sintered shale on the balance pan of a thirty pound capacity spring balance and the particles were crushed by applying a slowly increasing pressure with a quarter inch tool steel rod until the respective particles were broken or pulverized. The results are summarized in Table I. Visual observation of the crushed particles showed that the calcined trona was broken to a smaller size than the sintered shale.

TABLE I.—RELATIVE HARDNESS OF CALCINED TRONA AND SHALE

| −6 +8 Mesh Calcined Trona | | −4 +6 Mesh Calcined Trona | |
|---|---|---|---|
| Trona Fraction, Pounds [1] | Shale Fraction, Pounds [1] | Trona Fraction, Pounds [1] | Shale Fraction, Pounds [1] |
| 2.0 | 6.0 | 3.0 | 16.0 |
| 2.6 | >30 | 3.5 | >30 |
| 2.6 | 9.5 | 3.7 | 17.5 |
| 1.7 | 15.0 | 5.0 | 10.0 |
| 5.4 | 17.5 | 5.5 | 17.0 |
| 2.5 | 14.5 | 5.0 | 17.5 |
| 3.0 | 17.5 | 4.5 | 12.5 |
| 2.0 | 11.5 | 4.5 | 12.5 |
| 3.6 | 19.0 | 3.5 | 15.0 |
| 2.0 | 12.5 | 4.0 | 27.0 |
| | | 5.0 | 23.0 |
| [2] 2.7 | [2] 15.3 | 5.5 | 16.5 |
| | | 5.5 | 20.0 |
| | | 4.5 | >30 |
| | | 4.0 | 16.0 |
| | | 5.0 | >30 |
| | | 5.5 | >30 |
| | | [2] 4.5 | [2] 20.0 |

[1] The units of "pounds" represent the force required to shatter the particles of calcined trona and shale.
[2] Average.

The shale before calcination has an actual compressive strength of about 3225 p.s.i. while the compressive strength of the crude trona before calcination is about 7500 p.s.i. The actual compressive strengths of the calcined trona and shale were determined as being about 652 p.s.i. and about 2780 p.s.i., respectively, by an average of eight tests. These figures again show that the calcined shale is about five times as hard as the calcined trona.

The calcination of the crude trona can be effected at temperatures between 200° and 800° C. However, the temperature range of 400° to 800° C. is preferred as a large percentage of the organic impurities present in the crude trona is removed by volatilization at these temperatures.

The size of the mesh of the screening of the beneficiated particles will vary depending upon the size of the particles of crude trona after beneficiation, but it will usually vary between about 3 mesh and about 40 mesh, preferably about 20 mesh. The screen is preferably a ton-cap or tie-rod screen of the vibrating type when using roll crushers for the beneficiation.

The multiple roll crushers can have a series of pairs of rolls or merely one pair of rolls. If only one pair of rolls is present, the calcined trona may have to be run through the crusher more than once. At least one of each pair of rolls should be softer than the calcined shale so that the softer calcined trona will be crushed while the sintered shale will be compressed into the cushioned roll and not be crushed. A preferred commercial roll crusher is one in which the rolls are at least 10 inches in diameter and are covered with rubber approximately half an inch thick, the rubber being such that 1,00 pounds per square inch pressure is required to compress the rubber 0.15 inch.

In the following example there are described several preferred embodiments to illustrate the invention. However, it should be understood that the invention is not intended to be limited to the specific embodiments.

*Example I*

Crude trona as mined was calcined at a temperature of about 400° C. and a large sample of $-10+18$ mesh calcined trona having an insoluble content of 16.60% was obtained for the following runs.

A laboratory roll crusher consisting of two rolls was used to crush the calcined trona. One of the rolls was metal and the other roll was a metal roll covered with a six ply rubber and fabric steam hose three-quarters of an inch thick. There was no gap between the rolls.

The calcined trona was divided into four equal samples and each sample was passed through the rolls a different number of times. The crushed products were screened through a 20 mesh screen and four $-20$ mesh and four $+20$ mesh samples were obtained. The 20 mesh screen was employed as the products from the commercial calcining are $-20+100$ mesh calcined trona (natural dense soda ash) and $-100$ mesh calcined trona (light soda ash). The results are summarized in the following Table II.

TABLE II

| Number of passes | 1 | 2 | 3 | 4 |
| --- | --- | --- | --- | --- |
| Percent of total material in +20 mesh fraction | 59.9 | 45.1 | 35.5 | 32.4 |
| Percent of total material in −20 mesh fraction | 40.1 | 54.9 | 64.5 | 67.6 |
| Percent of insolubles in +20 mesh fraction | 23.01 | 32.21 | 35.97 | 40.68 |
| Percent of insoluble in −20 mesh fraction | 4.11 | 4.44 | 4.79 | 5.29 |
| Percent of original alkali content in −20 mesh fraction | 45.7 | 63.2 | 73.0 | 76.9 |
| Percent of insolubles removed in the +20 mesh fraction | 89.6 | 85.7 | 80.5 | 78.7 |

The above table shows that four passes through the crusher gave a high degree of recovery of alkali values with a high degree of removal of the insoluble material.

*Example II*

The example shows the effectiveness of the beneficiation process on trona containing various amounts of insoluble material.

The crude trona was calcined at about 400° C. and a large sample of $-6+8$ mesh calcined trona was obtained. The sample was split into five equal parts and then varying quantities of $-6+8$ mesh calcined shale were added to four of the samples. Each sample was passed through the roll crusher four times and the crushed samples were then screened into a $+20$ mesh fraction and a $-20$ mesh fraction. The various fractions were analyzed as before and the results are summarized in Table III.

TABLE III

|  | A | B | C | D | E |
| --- | --- | --- | --- | --- | --- |
| Percent of insolubles in feed | 3.10 | 4.58 | 7.62 | 9.91 | 13.61 |
| Percent of total feed in +20 mesh fraction | 28.4 | 31.8 | 32.4 | 34.5 | 37.0 |
| Percent of total feed in −20 mesh fraction | 71.6 | 68.2 | 67.6 | 65.5 | 63.0 |
| Percent of insolubles in +20 mesh fraction | 5.19 | 8.91 | 17.30 | 22.14 | 29.71 |
| Percent of insolubles in −20 mesh fraction | 2.27 | 2.56 | 2.99 | 3.47 | 4.15 |
| Percent of original alkali content in −20 mesh fraction | 72.2 | 69.6 | 71.0 | 70.2 | 69.9 |
| Percent of insolubles removed in +20 mesh fraction | 47.6 | 61.9 | 73.5 | 77.1 | 80.8 |

As can be easily seen from Table III, the recovery of the total alkali values is fairly constant regardless of the insoluble content of the calcined trona feed. There is a sharp increase in the percent of total insoluble removed as the percent of insolubles in the calcined trona feed increases.

By the process of calcining the crude trona to convert the sodium sesquicarbonate component to soda ash and soften the crystals thereof, preferential crushing of the calcined product to further crush the sodium carbonate while leaving the shale substantially uncrushed and screening the finer sodium carbonate particles from the coarser shale particles, a substantial separation of the soda ash from the shale can be effected and a crude soda ash of substantially uniform composition and a higher $Na_2CO_3$ content and less insoluble content can be produced.

Various modifications of the process of the invention may be made without departing from the spirit or scope thereof and it is to be understood that the invention be limited only as defined in the appended claims.

I claim:

1. A process for the preparation of crude soda ash having a low insoluble content which comprises calcining crude trona consisting mainly of a mixture of sodium sesquicarbonate and shale whereby the trona is transformed to porous soda ash crystals, pulverizing the resulting particles of calcined crude trona whereby the porous soda ash is broken to a smaller size than the shale, screening the pulverized calcined trona whereby the majority of the shale insolubles are retained on the screen and recovering the crude soda ash passing through the screen which crude soda ash has a low insoluble content.

2. The process of claim 1 wherein the pulverized calcined trona is screened through a screen of about 3 to about 40 mesh.

3. A process for the preparation of crude soda ash having a low insoluble content which comprises calcining crude trona consisting mainly of a mixture of sodium sesquicarbonate and shale whereby the trona is transformed to porous soda ash crystals, preferentially crushing the calcined crude trona with a multiple roll crusher whereby the porous soda ash is broken to a smaller size than the shale, screening the crushed calcined crude trona whereby the majority of the shale insolubles are retained on the screen and recovering the crude soda ash passing through the screen which soda ash has a low insoluble content.

4. The process of claim 3 wherein the crushed calcined crude trona is screened through a screen of about 3 to about 40 mesh.

5. The process of claim 3 wherein the roll crusher consists of a pair of rolls wherein at least one roll has a resilient surface.

References Cited by the Examiner

UNITED STATES PATENTS

| | | | |
|---|---|---|---|
| 2,343,080 | 2/1944 | Pike | 23—63 |
| 2,770,524 | 11/1956 | Seaton et al. | 23—63 |
| 2,962,348 | 11/1960 | Seglin et al. | 23—63 X |
| 3,073,673 | 1/1963 | Chubb | 23—63 |

MAURICE A. BRINDISI, *Primary Examiner.*